Feb. 20, 1923.                                                1,446,279.
J. SZAFKA.
COMBINATION SAUSAGE FILLER AND FRUIT PRESS.
FILED OCT. 7, 1922.                        4 SHEETS—SHEET 1.

INVENTOR
Joseph Szafka
By W. W. Williamson, Atty

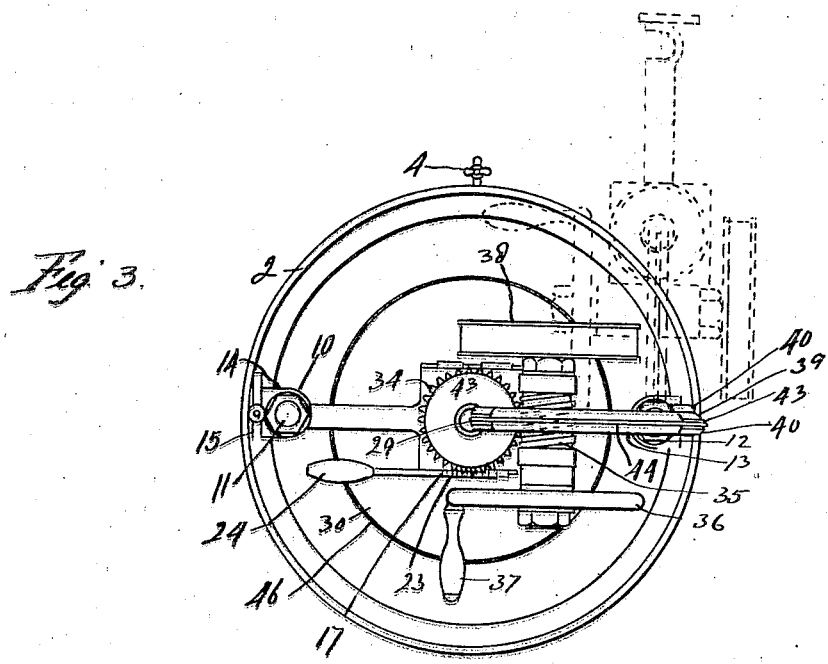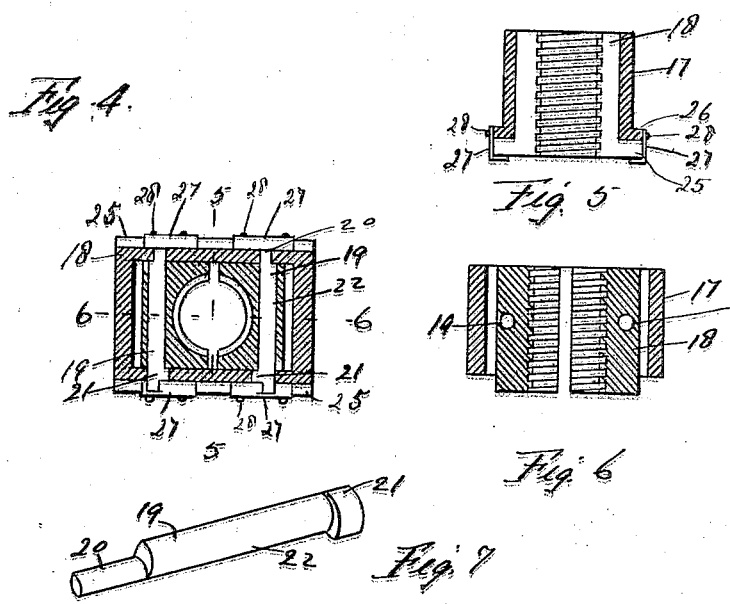

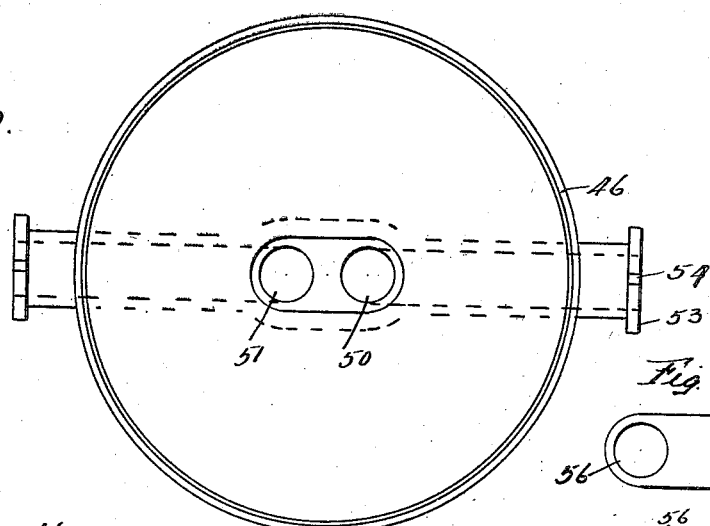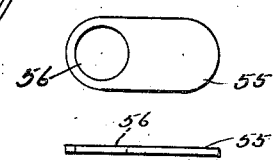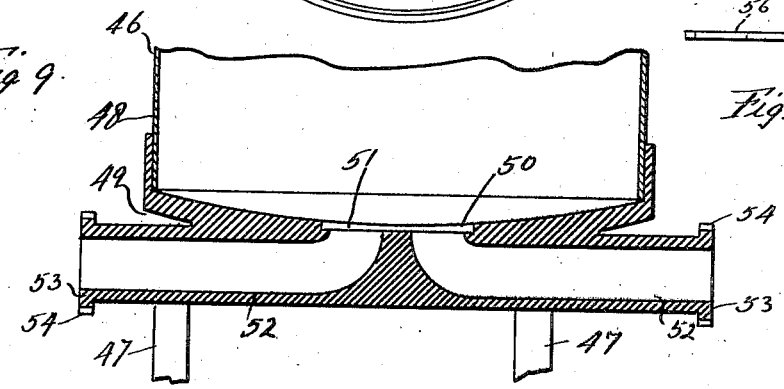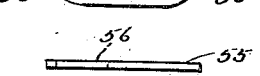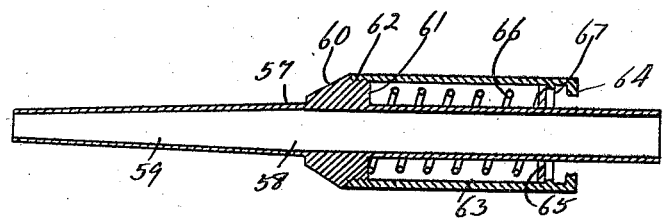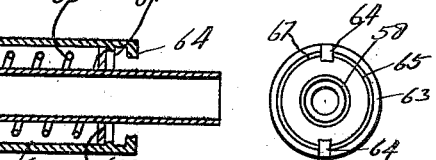

INVENTOR
Joseph Szafka
By W W Williamson Atty

Patented Feb. 20, 1923.

1,446,279

UNITED STATES PATENT OFFICE.

JOSEPH SZAFKA, OF PHILADELPHIA, PENNSYLVANIA.

COMBINATION SAUSAGE FILLER AND FRUIT PRESS.

Application filed October 7, 1922. Serial No. 592,932.

*To all whom it may concern:*

Be it known that I, JOSEPH SZAFKA, a citizen of the United States, residing at Philadelphia, in the county of Philadelphia and State of Pennsylvania, have invented new and useful Improvements in a Combination Sausage Filler and Fruit Press, of which the following is a specification.

My invention relates to new and useful improvements in a combination sausage filler and fruit press, and has for its primary object to provide interchangeable retainers which may be readily and quickly removed, cleaned and replaced.

Another object of the invention is to provide in combination with the framework and the operating screw, a crane detachably connected with the cross rod of the frame for supporting grooved pulleys or sheaves over which runs a cable connected with the operating screw and having a weight thereon to tend to lift the operating screw and its component parts.

Another object of the invention is to provide a split operating nut for the operating screw having improved actuating means and provided with members to maintain the sections of the operating nut within the housing.

A further object of the invention is to provide an imperforate meat receptacle of unique construction having a plurality of outlets and provided with a communicating recess in which is demountably positioned an apertured plate for closing certain of said outlets.

Another object of the invention is to provide a detachable nozzle for each of the outlets whereby nozzles of different sizes may be used, said nozzles having means to effectually seal the joints between them and the outlets.

A further object of the invention is to provide an independent plunger or piston for use in conjunction with the regular piston when the device is being used as a sausage filler.

A still further object of the invention is to provide the independent or detachable piston with resilient rings having means to contract them when said piston is being inserted or removed from the receptacle or container.

With these ends in view, this invention consists in the details of construction and combination of elements thereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 3, is a plan view thereof showing in dotted lines the position of the cross bar, the crane and their component parts when said cross bar is swung to one side.

Fig. 4, is a horizontal sectional view of the split nut and its housing.

Fig. 5, is a section at the line 5—5 of Fig. 4.

Fig. 6, is a section at the line 6—6 of Fig. 4.

Fig. 7, is an enlarged perspective view of one of the eccentric rods.

Fig. 8, is an enlarged plan view of the meat receptacle or vat.

Fig. 9, is a fragmentary sectional view thereof.

Fig. 10, is a face view of the apertured regulating plate.

Fig. 11, is an edge view thereof.

Fig. 12, is an enlarged sectional view of one of the nozzles with a portion illustrated in elevation.

Fig. 13, is an end view of Fig. 12.

In carrying out my invention as here embodied, 2 represents a suitable tub supported on legs 3 of any desirable length and having a spigot 4 connected therewith for drawing off any liquid accumulating within the tub. On the inside of the bottom of said tub are formed a plurality of ribs or projections 5 which act as guides for the fruit receptacle as well as producing channels through which the juices may run.

Figures 1, 2:
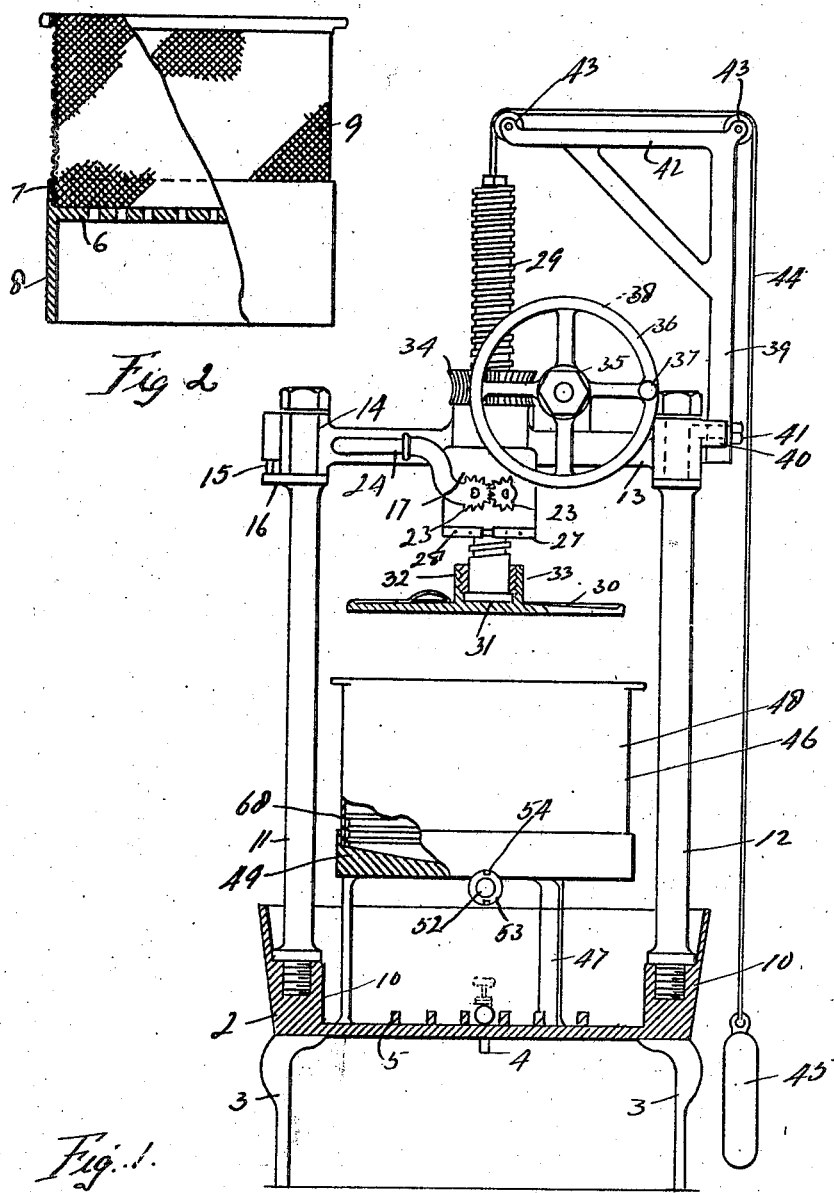
Fig. 1, is a sectional side elevation of my combination sausage filler and fruit press showing it in use as a sausage filler.
Fig. 2, is a sectional side elevation of the receptacle substituted for the ones shown in Fig. 1 when the device is used for pressing fruit to extract the juices therefrom.

Such a fruit receptacle is illustrated in Fig. 2 and consists of a perforated bottom 6 having an upstanding flange 7 and a depending flange 8 the latter to rest upon the bottom of the tub while to the upstanding flange is secured the lower end of the foraminous wall 9 and this wall may be braced or stiffened in any suitable or well known manner.

Within the tub are formed a number of bosses 10 into which are screw threaded the lower ends of the standards 11 and 12, the latter having the cross bar 13 journalled on its upper end while the free end of said cross bar has a socket 14 for coaction with the upper end of the standard 11 and when said cross bar is in an operative position, as shown in Fig. 1, it will be held by a suitable latch 15 coacting with the pin 16.

The cross bar carries intermediate its length a nut housing 17 in which are housed the sections of the split nut 18 each of said sections having an eccentric rod 19 located in a suitable transverse hole with the ends projecting beyond the nut section into holes in opposite walls of the housing by which means the said rod is journalled. Each rod consists of two end portions 20 and 21 of different diameters but concentric with each other with an intermediate portion 22 of larger diameter than the end portion 20 and of smaller diameter than the end portion 21, said intermediate portion being eccentric to both of the end portions so that by properly rotating both of said eccentric rods the nut sections will be moved toward or away from each other. In order to rotate these eccentric rods I provide each of them with a segmental gear 23 fixed to one end thereof, said gears meshing as plainly shown in Fig. 1. One of these segmental gears carries a handle 24 so that by the manipulation of said handle the eccentric rods will be actuated to open or close the sections of the split nut as will be obvious. Each of the nut sections is provided at its lower end with a flange 25 which projects beneath the nut housing so that the edges are substantially flush with the edges of the flanges 26 on the bottom of said housing and to each flange 25 of each nut section is secured an angle iron 27 by means of screws 28 or their equivalent while one of the toes or webs of each of these angle irons engage the upper face of the housing flange 26, as plainly shown in Fig. 5. By this arrangement the nut sections are properly supported while being free to move back and forth and therefore will not drop below their housing during certain movements thereof.

An operating screw 29 passes through a suitable hub formed with the cross bar and also through the split nut housing 17 where it is surrounded by the sections of the split nut in such manner that when the eccentric rods are rotated in the proper direction this split nut will engage the operating screw to cause the latter to move lengthwise when revolved as will be later described.

The lower end of the operating screw is swivelled to the plunger 30 by having a flange 31 formed thereon which fits in the hub 32 wherein is screwed a nut or bushing 33 surrounding the operating screw and engaging the flange 31. By this arrangement the operating screw will be free to revolve while the plunger is held against rotation and the revolving of this operating screw is effected by a spiral gear 34 which is journalled in the hub of the cross rod and splined to the operating screw. Thus when this spiral gear is revolved the operating screw will be caused to do likewise and if the split nut is in engagement with said operating screw the same will move lengthwise.

Meshing with the spiral gear is a spiral pinion 35 suitably journalled upon the cross rod 13 having connected therewith the hand wheel 36 or its equivalent carrying a crank handle 37 whereby the spiral pinion may be manually revolved and with this pinion is also connected a pulley 38 so that power may be transmitted thereto through the medium of a belt or its equivalent from some suitable source of power such as an engine or motor.

A crane 39 is carried by some suitable portion of a cross rod 13 so as to move therewith when the cross rod is moved from its operating position as shown in elevation in Fig. 3 to some open position such as is indicated by dotted lines in said figure. This crane is detachably mounted on the cross rod by socketing the lower end thereof between lugs 40 or their equivalent carried by the cross rod 13 and then threading a screw or bolt 41 through the lower end of the crane into a portion of the cross rod. The crane has an overhanging arm 42 which projects to a point approximately in line with the longitudinal center of the operating screw 29 parallel with the cross bar 13. On the crane are journalled grooved pulleys or sheaves 43 over which runs the cable 44 having one end connected with the upper end of the operating screw while to the other end of said cable is attached a suitable weight 45.

When it is desired to use the device as a sausage filler the meat vat or receptacle 46 having legs 47 is set in the tub 2 so as to align with the plunger 30. This meat vat comprises a suitable imperforate container 48 open at its upper end but provided with a bottom 49 concave on the inside, as plainly shown in Fig. 9. The bottom is recessed on the inside, as indicated at 50, and at the same location are formed the outlet openings 51 providing a communication between the interior of the meat vat or receptacle and the outlet spouts 52 of which any suitable number may be provided. These spouts are preferably formed integral with the bottom of the container and have flanges 53 at their outer ends in which are formed notches 54.

When it is desired to close certain of the outlet spouts, as for instance only when one is to be used, a regulating plate 55 is placed in the recess 50 said plate having an aperture 56 for registration with the outlet opening leading to that spout which is to be used.

Figure 16:
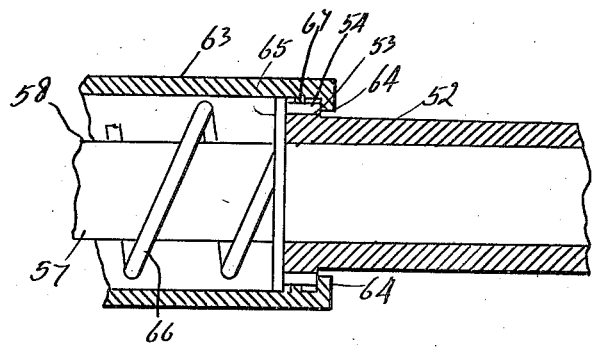
Fig. 16, is an enlarged fragmentary sectional view of one of the outlets from the meat receptacle with a nozzle attached.

To the outer end of each spout is adapted to be detachably connected a nozzle 57, Figs. 12 and 13, comprising a tubular conduit 58 tapered at its outer end as indicated at 59 and intermediate the ends of said tubular conduit is formed an enlargement or collar 60 having a reduced portion 61 threaded as at 62 onto which is screwed the tubular body 63 so that the walls of said body are spaced from the walls of the conduit. The inner end of the body terminates short of the inner end of the conduit and has formed thereon the inturned lugs or hooks 64 adapted to be passed through the notches 54 in the flange 53 and then engage the inner or rear face of the flange 53, as shown in Fig. 16, and when thus positioned the inner projecting end of the conduit 58 extends into the spout. In the body 63 surrounding the conduit 58 is slidably mounted a suitable washer 65 normally forced outward or rearwardly by a spring 66 within the body between the washer and collar 60 and in order to prevent said washer from being accidentally displaced by the spring I provide a stop 67 in the form of lugs or a rib said stop being so formed as to pass over the flange 53 when the nozzle is attached to the spout. As the nozzle is applied to the spout the washer will engage the face of the spout and be forced inward or forward against the action of the spring and as soon as the pressure of the nozzle is released the action of the spring will force the parts to their proper positions and effectually seal the joint between the nozzle and spout. The tapered end of the conduit 58 permits a jacket or skin to be readily placed over the nozzle prior to being filled.

Figure 14:
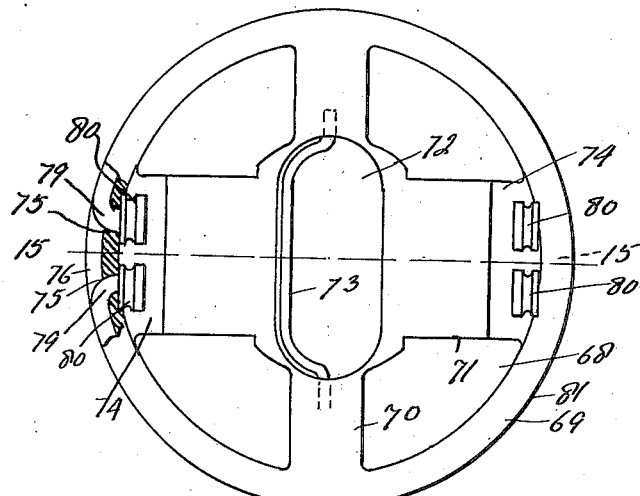
Fig. 14, is an enlarged plan view of the independent piston used in the meat receptacle.
Figure 15:
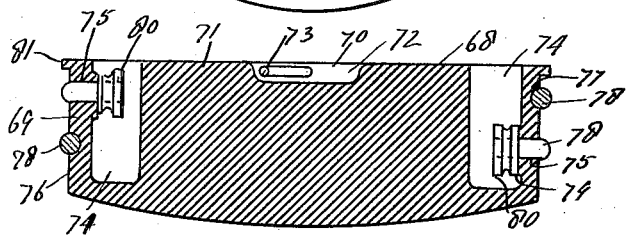
Fig. 15, is a section at the line 15—15 of Fig. 14.

In order to force the meat from the receptacle through the spouts and nozzles I provide an independent piston 68, Figs. 14 and 15, having a convex outer or bottom face to substantially correspond to the curvature of the concave inner face of the bottom of the receptacle to assist in forcing the meat toward the centrally located outlets 51. This piston includes an upstanding side wall or flange 69 having cross ribs 70 and 71 between diametrically opposite points thereof, said ribs being centrally recessed as at 72 to receive the adjustable handle 73 the ends of which are socketed in suitable openings in one of the ribs communicating with the recess 72 so that said handle may rest in the recess during the use of the piston or may be raised when it is desired to lift the piston out of the meat receptacle or transport it from place to place. At both ends of one of the ribs, as 71, is formed a chamber 74 having holes 75 communicating therewith formed in the side walls of the piston and the holes communicating with one of these chambers also communicates with an exterior circumferential groove 76 while the holes communicating with the other chamber also communicate with another exterior circumferential groove 77. In these grooves are located resilient rings 78 with their inturned ends 79 projecting into opposite chambers 74, in other words, the ends of the upper ring project into one chamber while the ends of the other or lower ring project into the opposite chamber. These inturned ends have burrs 80 threaded thereon and located within the chambers 74 so that the rings may be contracted and drawn snugly into their grooves in order that they shall not bind upon the sides of the meat receptacle when the piston is being placed therein or removed therefrom and in practice I have found it advisable to provide an outwardly projecting guide flange 81 at the upper end of the side walls of the piston the circumference of which is the same as the circumference of the piston rings when they are contracted and drawn into their grooves.

In practice when the device is used as a sausage filler the meat vat 46 is placed in the tub 2 as hereinbefore described with the nozzles attached to the spouts. The vat or receptacle is then supplied with the sausage meat and the independent piston 68, with its rings contracted, is placed in the receptacle on top of the meat and the burrs 80 then backed off a sufficient distance to permit the resilient rings to expand and engage the inner surface of the receptacle. Next the cross bar 13 is moved into its operative position, as shown in Fig. 1, and the split nut actuated so as to engage the operating screw then by revolving the spiral pinion either manually or by power derived from an engine or motor said operating screw will be fed downward causing the plunger 30 to force the independent piston downward to expel the contents of the receptacle 46.

After these operations have been completed the sections of the split nut are separated permitting the operating screw with its component parts to be quickly drawn upward with little effort because of the action of the weight 45. The cross bar 13 with its component parts is then swung to one side and the burrs 80 screwed onto the inturned ends of the piston rings for contacting the latter which will permit the independent piston to be readily withdrawn from the receptacle by means of the handle 73. After this has been done the receptacle may be removed and the parts readily and easily cleaned.

Of course I do not wish to be limited to the exact details of construction as herein shown, as these may be varied within the limits of the appended claims without departing from the spirit of my invention.

Having thus fully described my invention, what I claim as new and useful is:—

1. In a combination sausage filler and fruit press, a tub, means for supporting said tub, standards projecting from said tub, a cross bar having one end journalled upon the upper end of one of the standards and provided at its other end with means for detachably connecting said other end with the other standard, an operating screw passing through the cross bar, means supported by said cross bar to actuate said operating screw, a plunger carried by the lower end of said operating screw, a meat receptacle or vat having legs for supporting it within the tub, said receptacle having outlet spouts and an independent piston adapted to be placed within the receptacle and acted upon by the plunger.

2. The combination with a tub supported by suitable legs, standards projecting from said tub, a cross bar journalled on one of said standards and coacting with the other when in an operative position, an operating screw passing through the cross bar and means carried by said cross bar for actuating said operating screw, of a meat receptacle or vat having legs for supporting the same within the tub, spouts at the bottom of said receptacle and communicating with the interior thereof, said receptacle having a recess in the region of the points of communication between the interior of the receptacle and the spouts, and an apertured regulating plate for temporary insertion in said recess.

3. The combination with a tub supported by suitable legs, standards projecting from said tub, a cross bar journalled on one of said standards and coacting with the other when in an operative position, an operating screw passing through the cross bar and means carried by said cross bar for actuating said operating screw, of a meat receptacle or vat having legs for supporting the same within the tub, spouts at the bottom of said receptacle and communicating with the interior thereof, notched flanges located at the outer ends of the spouts, nozzles detachably connected with the notched flanges of the spouts and an independent piston removably mounted within the receptacle, said piston comprising a side wall having circumferential grooves, cross ribs at right angles to each other between portions of the side walls, one of said ribs having chambers at both of its ends with holes passing through the side walls to form communication between each chamber with one of the circumferential grooves, said ribs being centrally recessed, an adjustable handle mounted within said recess, resilient piston rings mounted in the circumferential grooves with their inturned ends projecting through the holes in the piston, side walls and burs located within the chambers and threaded on the inturned ends of the rings for contracting the same.

4. In a device of the character stated, a meat vat including a bottom the inner surface of which is concave, spouts communicating with the central portion of said bottom, and a piston having a convex lower surface slidably and removably mounted within said vat.

5. In a device of the character stated, a meat vat or receptacle having a recessed bottom and outlets leading from the bottom of said recess and a regulating plate removably mounted in the recess to close certain of said outlets and having an aperture for registration with one of the outlets so that such outlet remains open.

6. In combination with a receptacle in a device of the character stated, a hollow piston having ribs therein, one of said ribs having a chamber at each end, the side walls of said piston having holes therethrough communicating with the chambers and with one of a plurality of circumferential grooves in the exterior face of the piston side walls, resilient rings having inturned ends positioned in the grooves with said inturned ends projecting through the holes into the chambers, and means on the inturned ends of said rings for contracting the same.

7. In combination with a receptacle in a device of the character stated, a hollow piston having ribs therein, one of said ribs having a chamber at each end, the side walls of said piston having holes therethrough communicating with the chambers and with one of a plurality of circumferential grooves in the exterior face of the piston side walls, resilient rings having inturned ends positioned in the grooves with said inturned ends projecting through the holes in the chambers, burrs threaded on the inturned ends of the rings and located within the chambers so as to engage the inner face of the piston side wall for contracting the rings and drawing them into their respective grooves, and an outwardly projecting flange at the upper end of the piston side wall of a diameter substantially equal to the diameter of the rings in their contracted condition.

In testimony whereof, I have hereunto affixed my signature.

JOSEPH SZAFKA.